US005732229A

United States Patent [19]
Dickinson

[11] Patent Number: 5,732,229
[45] Date of Patent: Mar. 24, 1998

[54] METHOD AND APPARATUS FOR DISPLAYING BUSINESS CARDS

[75] Inventor: Robert David Dickinson, Hayward, Calif.

[73] Assignee: Object Technology Licensing Corporation, Cupertino, Calif.

[21] Appl. No.: 662,516

[22] Filed: Jun. 13, 1996

Related U.S. Application Data

[63] Continuation of Ser. No. 7,660, Jan. 22, 1993, abandoned.

[51] Int. Cl.$^6$ .................................................. G06F 3/00
[52] U.S. Cl. ............................................. 395/334; 395/351
[58] Field of Search .............................................. 395/334

[56] References Cited

U.S. PATENT DOCUMENTS

| | | | |
|---|---|---|---|
| 3,658,427 | 4/1972 | DeCou | 356/139.03 |
| 3,881,605 | 5/1975 | Grossman | 414/730 |
| 4,082,188 | 4/1978 | Grimmell et al. | 209/580 |
| 4,635,208 | 1/1987 | Coleby et al. | 364/491 |
| 4,677,576 | 6/1987 | Berlin, Jr. et al. | 395/120 |
| 4,704,694 | 11/1987 | Czerniejewski | 382/288 |
| 4,742,356 | 5/1988 | Kuipers | 342/448 |
| 4,821,220 | 4/1989 | Duisberg | 364/578 |
| 4,885,717 | 12/1989 | Beck et al. | 395/704 |
| 4,891,630 | 1/1990 | Friedman et al. | 345/156 |
| 4,939,648 | 7/1990 | O'Neill et al. | 364/422 |
| 4,953,080 | 8/1990 | Dysart et al. | 395/614 |
| 5,025,395 | 6/1991 | Nose et al. | |
| 5,041,992 | 8/1991 | Cunnigham et al. | 395/135 |
| 5,050,090 | 9/1991 | Golub et al. | 364/478.05 |
| 5,060,135 | 10/1991 | Levine et al. | 395/351 |

(List continued on next page.)

OTHER PUBLICATIONS

Electronics and Communications in Japan Part 1: Communications. V.76(1), Jan. 1993, New York US, pp. 11–23, S. Hattori et al. "A Multimedia Intelligent Message Communication System for Distributed Coordination Environments" pp. 15, 16.

Hewlett-Packard Journal. V.41(5), Oct. 1990, Palo Alto, CA, US, pp. 11–20, M. Thi Tran et al. "The HP IVI Object-Oriented Toolkit".

IBM Technical Disclosure Bulletin. V.35(4B), Sep. 1992, New York, US, pp. 291–293 "Calling Card Interface for Visual Telephony".

Patent Abstracts of Japan. V.16(28)(P1302) Jan. 23, 1992 & JP, A.03 240 163 (Hitachi) Oct. 25, 1991.

IBM Technical Disclosure Bulletin. V.35(4B), Sep. 1992, New York, US, pp. 237–238 "Public Nicknames in dOS/2 Office Address Book".

IBM Technical Disclosure Bulletin. V.34(5), Oct 1991, New York US, pp. 309–310 "Office Container Class".

IBM Technical Disclosure Bulletin. V.33(11), Apr. 1991, New York US, pp. 287–288 "Enhanced Directory Entries".

IBM Technical Disclosure Bulletin. V.33(9), Feb. 1991, New York US, pp. 1–4 "Address Book Class Hierarchy".

Proceedings 23rd Annual Hawaii International Conference on System Sciences, V.1, 1990, Los Alamitos, CA, US, pp. 363–372, K.A. Griggs "A Visual Agent Approach for Modeling Organizations", pp. 367,368.

Rupp; Executive's Guide to Electronic Organizers ( 1993 Catalog); Nov. 1992.

Wizard. The Gift of Organization; Sharp advertisement; 1992.

*Primary Examiner*—Parshotam S. Lall
*Assistant Examiner*—Kenneth R. Coulter
*Attorney, Agent, or Firm*—Bookstein & Kudirka

[57] ABSTRACT

A method and apparatus for representing the attributes of an object representing a person or entity in an object oriented operating system running on a computer networked to other computers. The information is presented in the form of a graphic depiction of a business card with information specific to a particular person, place or thing appearing on the business card. The information on the business card and the card itself can be used to invoke various actions. Further, any information on the card can be copied, pasted or otherwise manipulated by the system.

25 Claims, 9 Drawing Sheets

U.S. PATENT DOCUMENTS

| | | | |
|---|---|---|---|
| 5,060,276 | 10/1991 | Morris et al. | 382/151 |
| 5,075,848 | 12/1991 | Lai et al. | 395/479 |
| 5,093,914 | 3/1992 | Coplien et al. | 395/704 |
| 5,119,475 | 6/1992 | Smith et al. | 395/353 |
| 5,125,091 | 6/1992 | Staas, Jr. et al. | 395/671 |
| 5,133,075 | 7/1992 | Risch | 395/800 |
| 5,136,705 | 8/1992 | Stubbs et al. | 395/183.03 |
| 5,151,987 | 9/1992 | Abraham et al. | 395/182.18 |
| 5,168,441 | 12/1992 | Onarheim et al. | 364/146 |
| 5,177,685 | 1/1993 | Davis et al. | 364/443 |
| 5,181,162 | 1/1993 | Smith et al. | 395/792 |
| 5,212,787 | 5/1993 | Baker et al. | 395/612 |
| 5,226,117 | 7/1993 | Miklos | 395/365 |
| 5,392,389 | 2/1995 | Fleming | 395/349 |
| 5,404,442 | 4/1995 | Foster et al. | 395/348 |
| 5,448,695 | 9/1995 | Douglas et al. | 395/347 |
| 5,477,447 | 12/1995 | Luciw et al. | 395/754 |
| 5,491,784 | 2/1996 | Douglas et al. | 395/352 |
| 5,500,929 | 3/1996 | Dickinson | 395/356 |

METHOD AND APPARATUS FOR DISPLAYING BUSINESS CARDS

This application is a continuation of application Ser. No. 08/007,660 filed Jan. 22, 1993, now abandoned.

CROSS REFERENCE TO RELATED PATENT APPLICATION

This patent application is related to the patent application entitled Object Oriented Framework System, by Debra L. Orton, David B. Goldsmith, Christopher P. Moeller, and Andrew G. Heninger, filed Dec. 23, 1992, and assigned to Taligent, the disclosure of which is hereby incorporated by reference.

FIELD OF THE INVENTION

This invention generally relates to the representation of a person or entity within an object oriented operating system, and more particularly, to the accessing of the represented person or entity through a selected communication path.

Few individuals work upon a particular project in the absence of others. In contrast, a group of individuals typically work together upon a project. In particular, large work tasks are usually divided into smaller tasks which are, in turn, divided among a number of individuals. Hence, although work may be divided in many different ways, collaboration among individuals is ordinarily a necessity.

In order for diverse tasks to be accomplished, individuals must share information and ideas. Presently, personal computers are capable of providing document file sharing, print sharing, electronic mail and other methods of information sharing and communicating through local area networks.

Despite the advancements which have taken place in the area of local area networks, problems still exist. First, no universal naming service exists among networked computers. In other words, no common framework for names and representations of individuals exists within current networks to identify both network and non-network users. As a consequence, networks are filled with different locations for retrieving information concerning users. For instance, a set of applications, such as a directories or files, may be maintained to deal with a particular group of users for a particular application. However, no commonality exists among the set of files and directories for updating purposes. Therefor, a change in information will likely be reflected in some but not all applications since they are independent of each other. This processing increases the complexity of maintenance and leads to inconsistent usage of applications.

A second problem lies in the fact that applications only provide for network communications between network users. Individuals regularly interact, however, with many individuals who are outside the network. Thus, individuals who are not directly attainable by computer are not represented within computer applications. Moreover, network users which are represented within an application can only be communicated to through network channels.

Business cards are real-world objects which individuals typically can and do collect from others. Studies have shown that individuals retain approximately 150 business cards at any one time. Moreover, studies have demonstrated a desire among individuals to organize business cards in some manner.

Business cards typically indicate the various methods of communicating with the individual to whom the business card refers. Such communication methods ordinarily include telephone, computer network, electronic mail, facsimile, telecommunication business mailing address and home mailing address, among others. In contrast to business cards, however, current computer applications do not provide a user with an option of communication methods.

In sum, current computer applications fail to provide a user with a means by which individuals may communicate with others through different mediums. This is so whether or not the individuals sought to be communicated with are common network users. Furthermore, current computer applications fail to provide a common framework of information with respect to individuals. Thus, the prior art that the applicant is aware of provides a system that is overly restrictive and insufficiently accurate for performing typical communications.

SUMMARY OF THE INVENTION

The present invention overcomes the aforementioned deficiencies of the prior art by providing a system for communications with individuals through the formation and manipulation of diverse communication information.

The present invention provides an object oriented operating system for storing global communication information about persons or entities within a desktop environment. The information is stored with an object which is then made available for user interaction. Further, the present invention allows for direct manipulation of the objects so as to perform tasks such as addressing mail messages and establishing telephone connections. Moreover, the present invention provides for the formation of a set of business cards where each business card contains a method of communication. Formed business cards can be duplicated wherein the duplicated business card is synchronized and updated with original cards.

Such aforementioned attributes are contained within the present invention for integration within diverse network environments. The focus of the present invention thus provides an environment wherein diverse methods of communication are provided. Hence, such applications assist a user in making effective use of a workstation for communicating with others.

BRIEF DESCRIPTION OF THE DRAWINGS

The foregoing and other aspects and advantages of the present invention will be better understood from the following detailed description of the preferred embodiment of the invention with reference to the accompanying drawings, in which.

DETAILED DESCRIPTION OF THE PREFERRED EMBODIMENT OF THE INVENTION

Computer System

Figure 1:
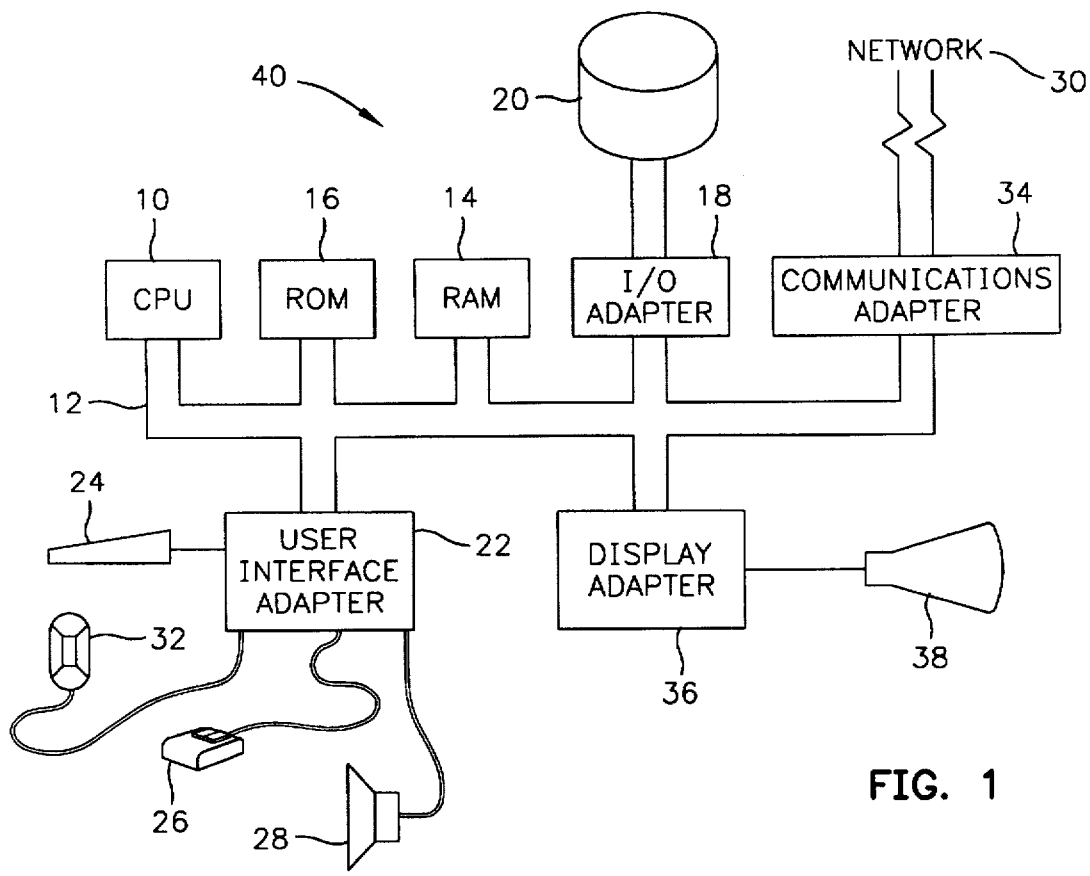
FIG. 1 is a block diagram of a computer system in accordance with the present invention.

A representative hardware environment is depicted in FIG. 1, which illustrates a suitable hardware configuration of a workstation 40 in accordance with the present invention. The workstation 40 has a central processing unit 10, such as a conventional microprocessor, and a number of other units interconnected via a system bus 12. The illustrated workstation 40 shown in FIG. 1 includes a Random Access Memory 14 (RAM), a Read Only Memory 16 (ROM), an I/O adapter 18 for connecting peripheral devices such as disk units to the bus 12, a user interface adapter 22 for connecting a keyboard 24, a mouse 26, a speaker 28, a microphone 32, and/or other user interface devices such as a touch screen device (not shown) to the bus 12. The workstation 40 may also have a communications adapter 34 for connecting the workstation 40 to a data processing network 30 and a display adapted 36 for connecting the bus 12 to a display device 38.

Composition of Business Cards

A business card is a document which contains a set of information pertaining to various environments. A business card may contain a great variety of information relating to an individual. The following information is illustrative of the type of information that can be contained within a business card: name; job title; division, department, and group identification; manager name; employee identification number; work telephone numbers; home phone number (voice and data); home facsimile number; business address; home address; workstation server name; workstation zone; workstation drop box volume name; preferred printer; secondarily preferred printers; protocol addresses such as TCP/IP, AppleTalk, OSI, and XNS; mail addresses such as Internet address, X.400 address, AppleLink™ address, QuickMail address, BITNET and UUCP; editable notes that the holder of the business card has regarding the person represented by the business card; and, a unchangeable comment or note written by the person represented by the business card.

Selected information is displayed when a business card is initially opened. A business card within its initial state is a composition of text, graphics and icons which represent information relating to the business card owner. Other information may be displayed through progressive disclosure mechanisms. The two progressive disclosure mechanisms are (i) a set of tabs, and (ii) a list view.

Figure 2:
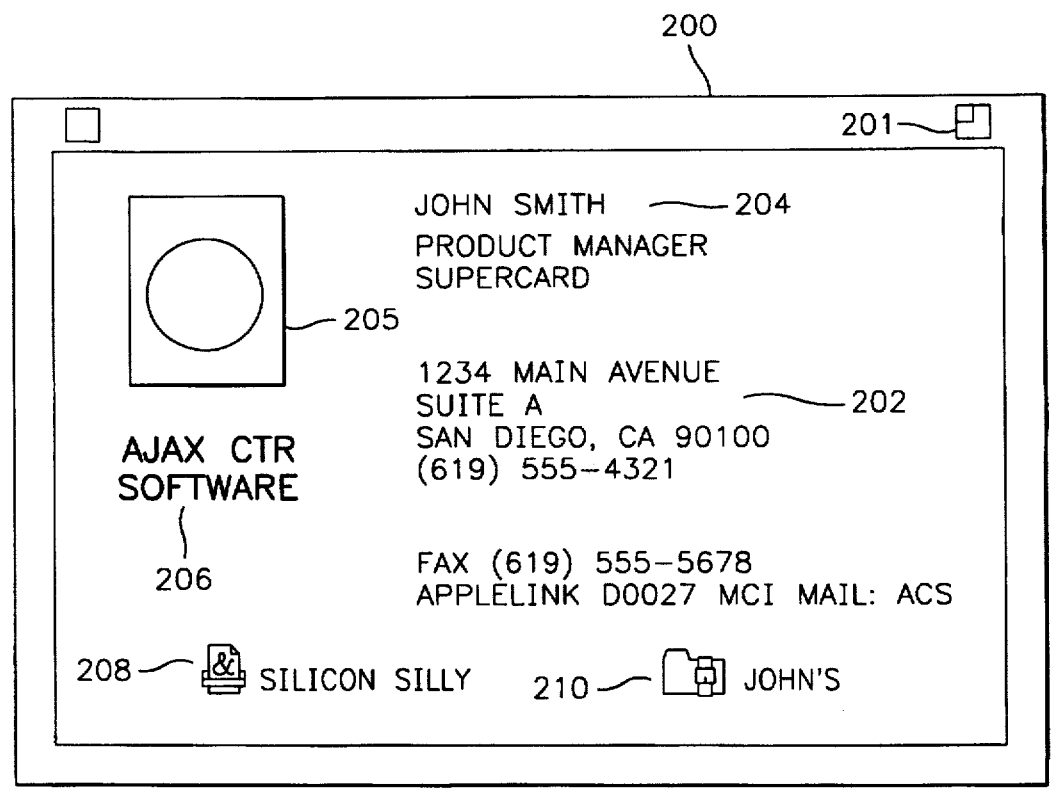
FIG. 2 illustrates a business card in its initial open state in accordance with the present invention.

Referring to FIG. 2, a business card in its initial open state is illustrated. The initial open state 202 of business card 200 comprises text 204, graphics 206 and icons 208 and 210. Text 204 indicates: the owner of the business card ("Kevin Larue"); the position of the business card owner ("Product Manager"—"Super Card"); the address of the business card owner ("9770 Carrol Center Road"—"Suite J"—"San Diego, Calif. 92126"); the telephone number of the business card owner ("(619) 695-6956"); the facsimile number of the business card owner ("(619) 695-7902"); and various electronic communication data ("Applelink D0027 MCI Mail: SBS"). Graphic 206 indicates the name of the entity within which the business card owner is associated "Silicon Beach Software"). Icons 208 and 210 provide further information about the business card owner upon being engaged by double-clicking of a mouse.

The specific layout and items that are presented are formatted according to user requirements under user control. Items are selected from the primary view to prepare a progressive disclosure view. This flexibility provides control for, progressive display of a window according to a user's requirement. A user can selectively display the primary view or the progressive view using the control at 201.

Figure 3:
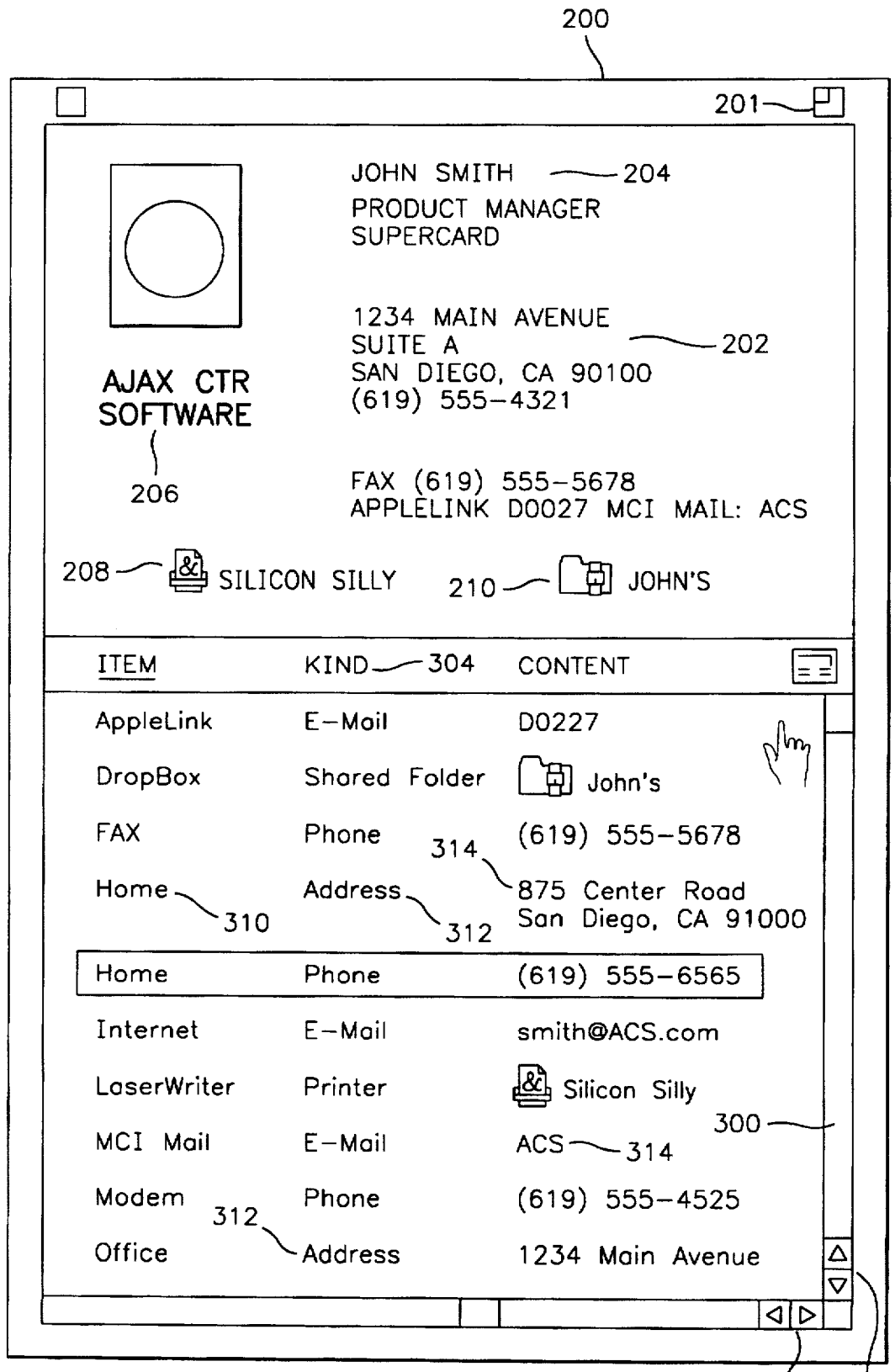
FIG. 3 illustrates a list view of a business card in accordance with the present invention.

Referring to FIG. 3, a list view of a business card is illustrated. List view 300 of business card 200 is appended to the bottom of initial open state 202 when selected through engagement of icon 210. List view 300 contains item column 302, kind column 304 and content column 306. Each item 310 is thus described by its method of communication content as referred to with reference numerals 312 and 314, respectively. The list view 300 may be scrolled in any direction by scrolling arrow set 316. Display column headings 302 are extensible and dynamic sorting is available using any of the columns as sort fields.

Referring to FIGS. 4 through 7 a set of tabs for business card 200 is illustrated. A tab is appended to the bottom of initial open state 202 when selected through the engagement of icon 210.

Figure 4:
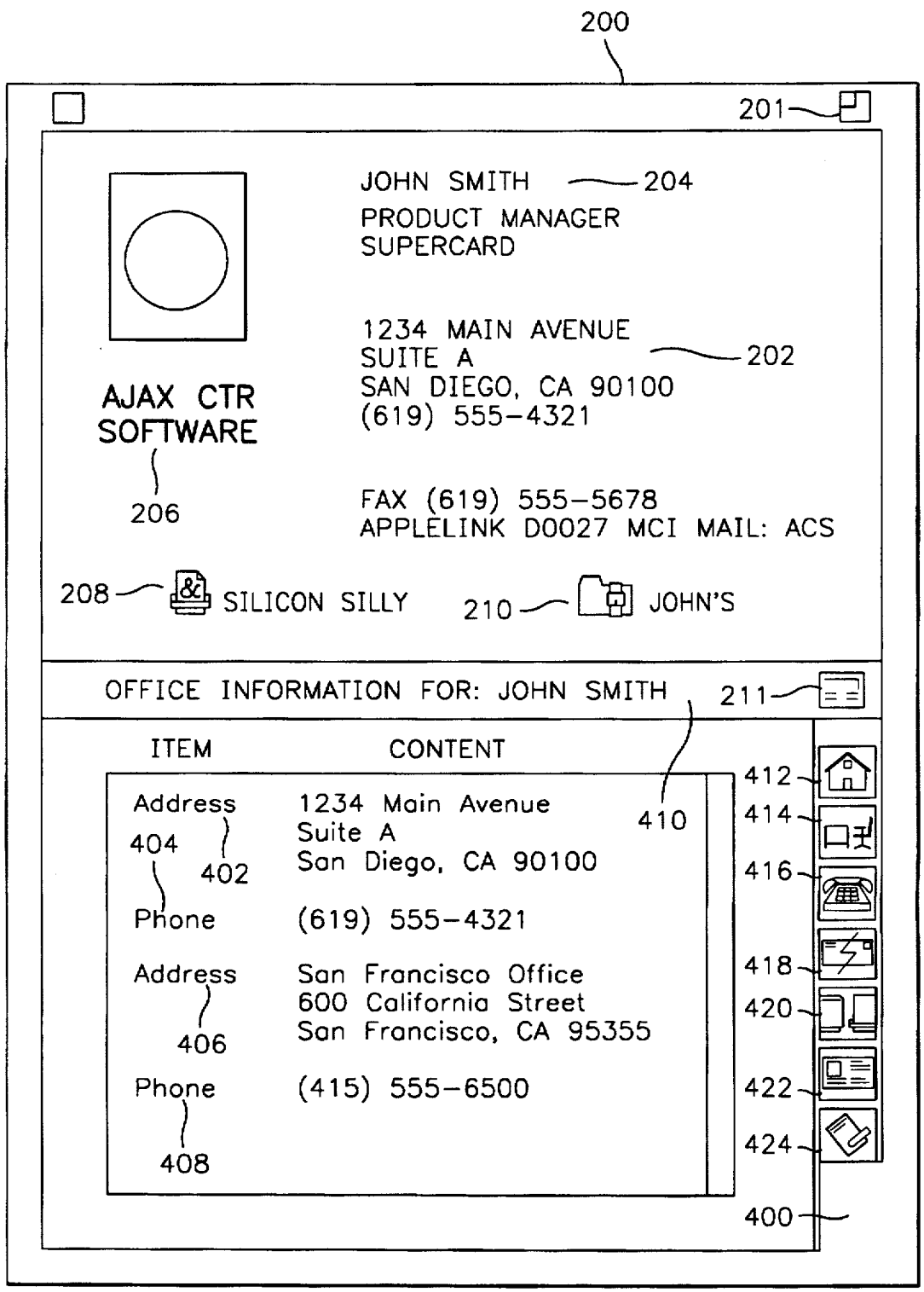
FIG. 4 illustrates a tabbed view of a business card with an office tab selected in accordance with the present invention.

Referring to FIG. 4, an office tab of business card 200 is illustrated. Office tab 400 displays information concerning the place of business of the business card owner as indicated by title 410. Accordingly, addresses 402 and 406 and business telephone numbers 404 and 408 are displayed. Office tab 400 also displays icons 412, 414, 416, 418, 420, 422 and 424 which represent residence information, mailing address information, telephone information, electronic mail information, printer information, contacts, and various notations, respectively. Selection of any such icon by clicking with a mouse results in the display of a tab corresponding to the selected icon. A switch 211 is available to toggle between a list and a tabbed view of information in a business card.

Figure 5:
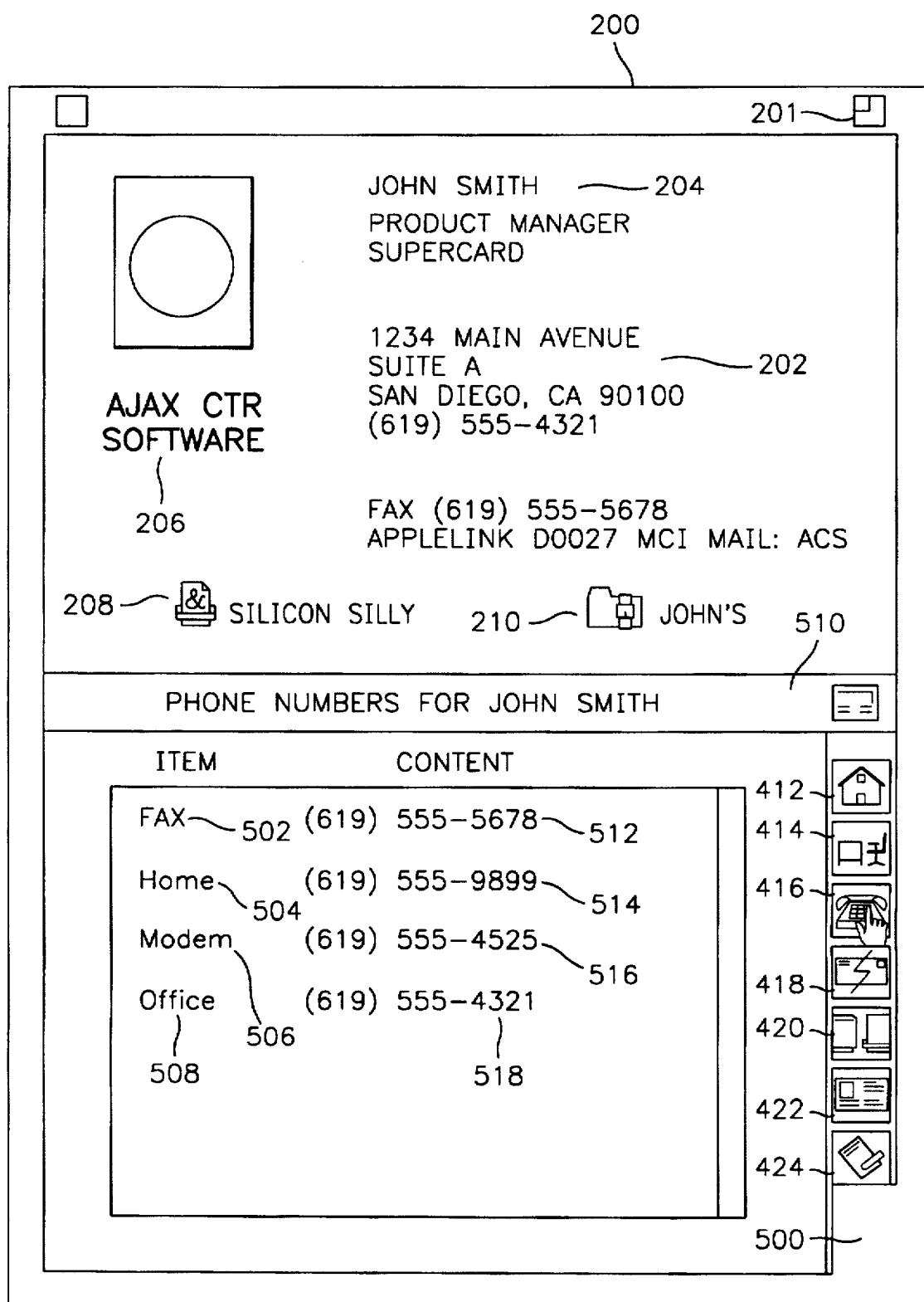
FIG. 5 illustrates a tabbed view of a business card with a telephone tab selected in accordance with the present invention.

Referring to FIG. 5, a telephone tab of business card 200 is illustrated. Selection of icon 416 displays phone tab 500. Phone tab 500 contains information concerning the various telephone numbers of the business card owner as indicated by title 510. Such information comprises items 502, 504, 506 and 508 which denote facsimile, home, modem and office telephone numbers, respectively. The telephone numbers of items 502, 504, 506 and 508 are referred to with reference numerals 512, 514, 516 and 518, respectively.

Figure 6:
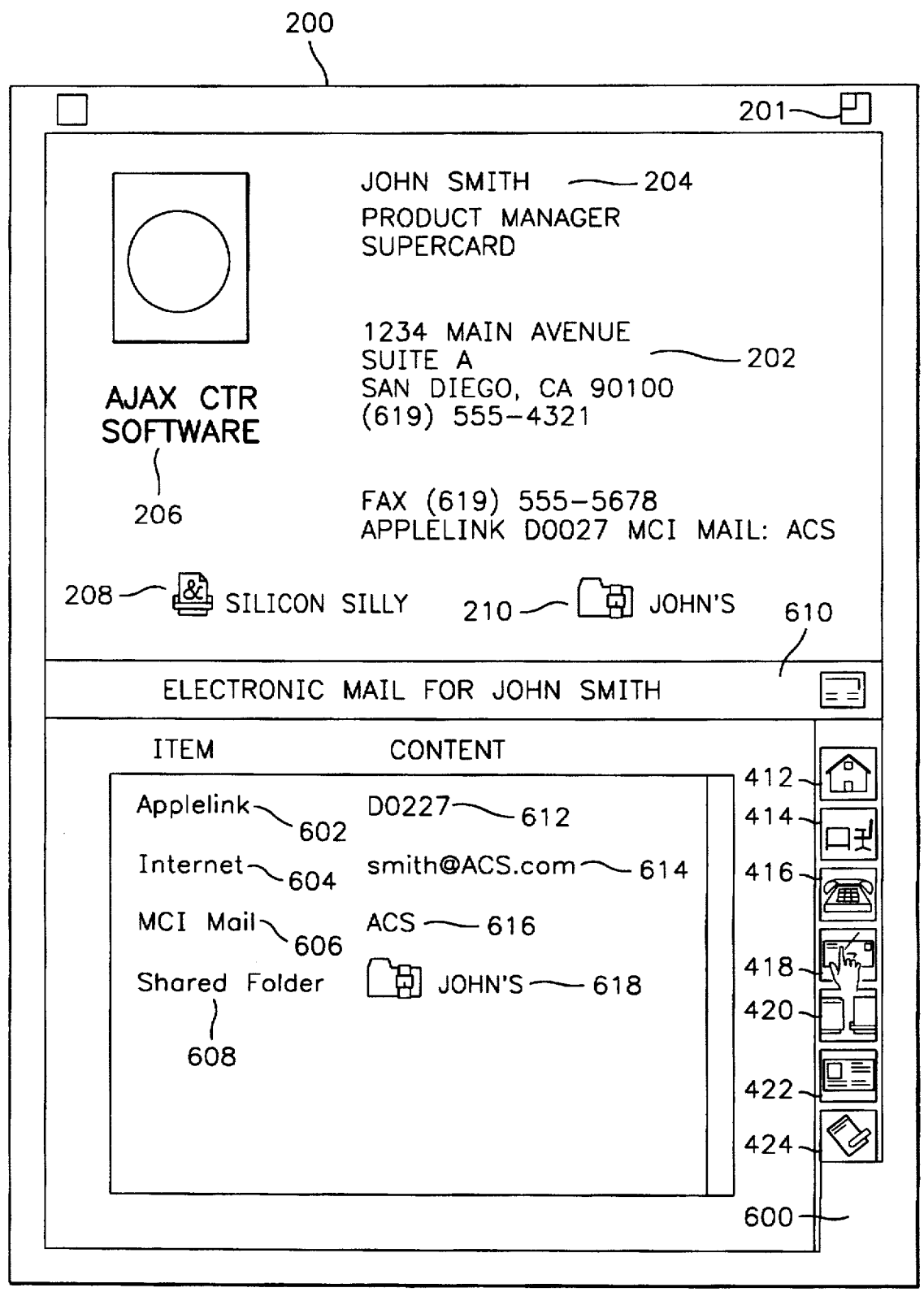
FIG. 6 illustrates an electronic mail tab of a business card in accordance with the present invention.

Referring to FIG. 6, an electronic mail tab of business card 200 is illustrated. Selection of icon 418 displays electronic mail 600. Electronic mail 600 contains information concerning the various telephone numbers of the business card owner as indicated by title 610. Such information comprises items 602, 604, 606 and 608 which denote AppleLink, Internet, MCI Mail, and Shared Folder methods of electronic mail, respectively. The address listings of items 602, 604, 606 and 608 are referred to with reference numerals 612, 614, 616 and 618, respectively. It should be noted that address listing 618 of item 608 is also shown as icon 210. This follows since item 608 represents a shared folder containing multiple electronic mail recipients.

Figure 7:
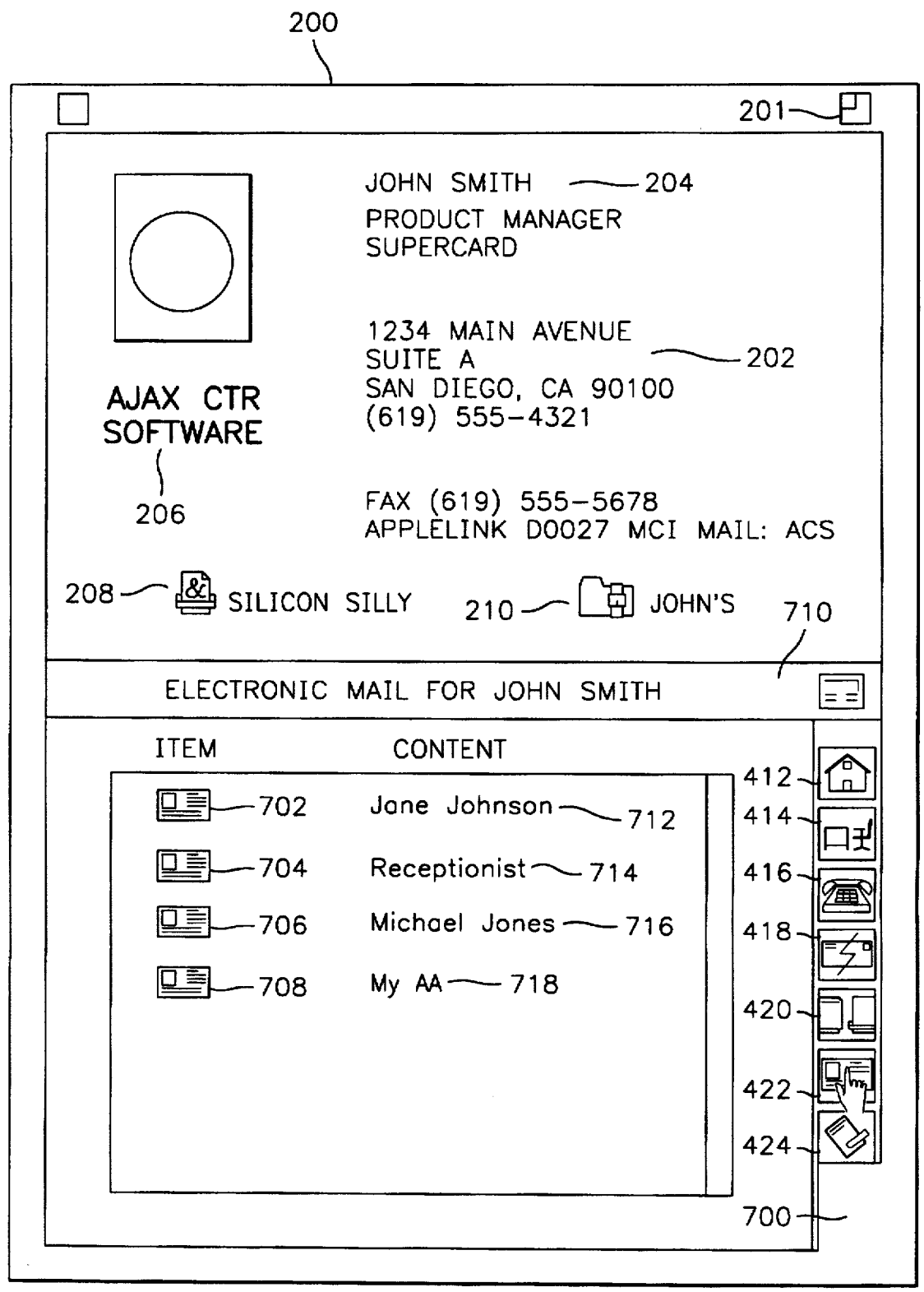
FIG. 7 illustrates a contacts tab of a business card in accordance with the present invention.

Referring to FIG. 7, a contacts tab of business card 200 is illustrated. Selection of icon 422 displays contacts tab 700. Contacts tab 700 contains information concerning the various contacts of the business card owner as indicated by title 710. Such information comprises items 702, 704, 706 and 708. Items 702, 704, 706 and 708 denote the names of four contacts whose names are referred to with reference numerals 712, 714, 716 and 718, respectively.

Business cards can be either published or personal. Published business cards are those business cards which are deposited in a central store or are otherwise globally available. Published business cards are also responsive to browsing applications through predetermined protocols. In contrast, personal business cards are not known to the rest of the network. They are only contained within the local workstation. Personal business cards are created when particular information is of a private nature or because the information is not relevant to others upon the network. For example, friends or contacts of a network user, that are attainable by telephone or are not on the network, would be contained within a personal business card.

A network user, to whom a business card refers, chooses the pieces of information from the person object that should be inserted within a business card. Similarly, information concerning a non-network user is judiciously selected for insertion within a business card. Some information may be personal and the user would not want it to be distributed such as a home telephone number. For instance, the individual may want the capability to create a business card containing such information, as well as other less public information, for distribution among friends or trusted colleagues. However, the individual may also want to be able to have a business card without such information to distribute to others.

In addition to the distinction between published and personal business cards, business cards are organized in terms of the information contained therein. In particular, a business card can store information regarding: (i) individual persons; (ii) groups of persons, which in turn refer to business cards of individual persons; and (iii) personas which do not represent an actual person, but a role. For example, a business card relating to a persona could refer to a research librarian. Such a business card comprises one or more contacts which contain further information for how to contact the persona, and there can even be a dynamic selection of one such contact at communication time.

Business Card Information Storage and Retrieval

Business cards are constructed to provide network and non-network communications. In particular, the present invention provides address information for establishing network connections. This might include simple protocol addresses such as a TCP/IP numeric address or a sophisticated stack definition. Non-network communications, such as phone dialing, are also supported by the present invention. Further, business cards store information that concern various types of connections. Such information includes different protocol families, electronic mail addresses, and phone and facsimile information. Moreover, business cards contain information to support multiple protocol address types such as BabelFish stack definitions which include AppleTalk and TCP/IP.

A person object is an object which contains global communication information concerning a particular individual. A person object is typically located on the workstation utilized by the network user to which the person object refers. A business card object which refers to a particular user may be retained when the such user relocates to a different workstation so as to maintain a consistent environment. The person object is not considered, however, to be a source of public information. This is in contrast to published business cards which are sources of public information.

The person object is used as a repository of a large set of environment information for a user. Such environment includes workspace configuration information and user-specific preferences. Business cards, however, are considered to be a subset of the information contained within a person object. Accordingly, each business card contains information which pertains to methods of communication. Being just a document representation, it is possible and often useful to have multiple business cards for an individual represented by a given person object.

Ordinarily, an original business card is created from the information within the person object. Less frequently, an original business card is created in the absence of a person object. Regardless of the manner of creation, an original business card is also referred to as a master business card. The person described by a given master business card is referred to as the master business card owner.

Once formed, a master business card may be copied to form a number of duplicated or replicated business cards. The information within both duplicated and replicated business cards corresponds to that information within the master business card. Replicated business cards are, however, be adapted to the subjective tastes of the user who copied the master business card. In contrast, duplicated business cards are unchanged copies of master business cards.

A publishing host is the workstation where a master business card was created. The publishing host is also the likely the place where the corresponding person object resides since the information contained within the master business cards typically derives from a person object. Individual workstations will thus typically have a mixture of master business cards and replicated business cards. Workstations that have a duplicated or replicated master business card are referred to as recipient card-holders and replicated hosts, respectively.

Defining a mixing class, such as MHasProperties, provides for an efficient means to integrate common functionality among person objects, name service objects, and business card objects. In the absence of a mixing class, different storage models would be necessary for each backing object.

Figure 8:
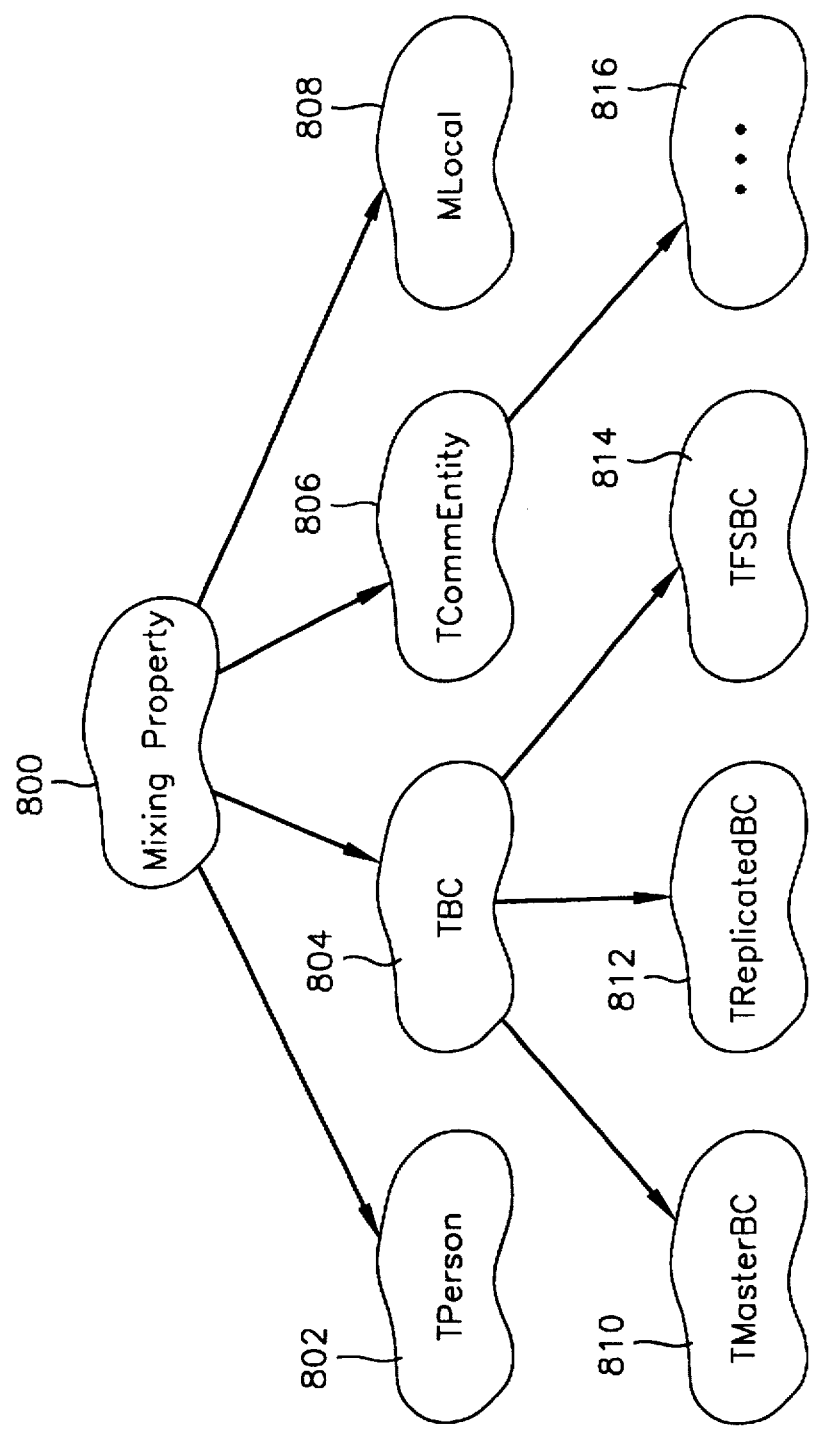
FIG. 8 illustrates an inheritance hierarchy for the mixing properties of the present invention.

Referring to FIG. 8, an inheritance hierarchy for the mixing properties of the present invention is illustrated. Mixing property 800 has four classes. Namely, the four classes are Person, TBC, TCommEntity, and MLocal which are referred to by reference numerals 802, 804, 806 and 808, respectively. Class TPerson 802 refers to the class of existing person objects. Class TBC 804 defines the abstract interface of business cards. Class TCommEntity 806 defines the network name service that contains a set of directories of resource names and addresses. Class MLocal 808 defines the business card data found within a particular workstation.

Classes TBC 804 and TCommEntity 806 are further decomposed into sub-classes. Class TBC 804 is further decomposed into classes TMaster BC, TReplicated BC and TFSBC which are referred to with reference numerals 810, 812 and 814, respectively. Class TCommEntity 806 is also further decomposed into the distinct directories which possess resource names and addresses. This is indicated by class 816.

Figure 9:
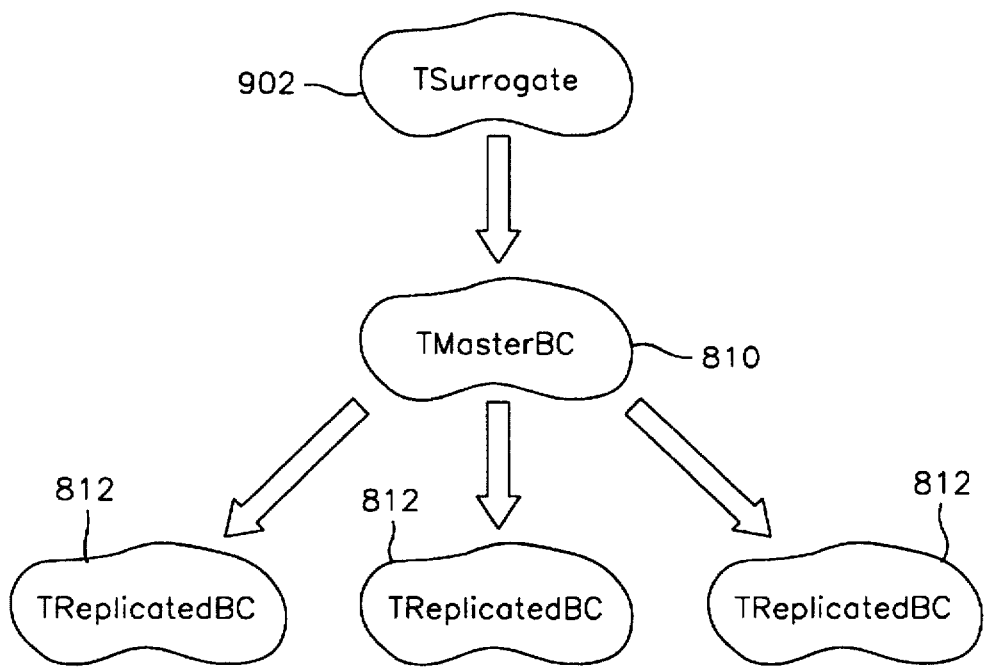
FIG. 9 illustrates a data flow diagram for the business card information in accordance with the present invention.

Referring to FIG. 9, a data flow diagram for the business card information is illustrated. Information is initially contained within class TSurrogate 902 which derives its information from class TPerson 804. Class TSurrogate 902 directly passes all information to class TMaster BC 810. In turn, class TMaster BC 810 passes the data obtained from class TSurrogate 902 to the class of replicated business cards as denoted by class TReplicated BC 812.

Figure 10:
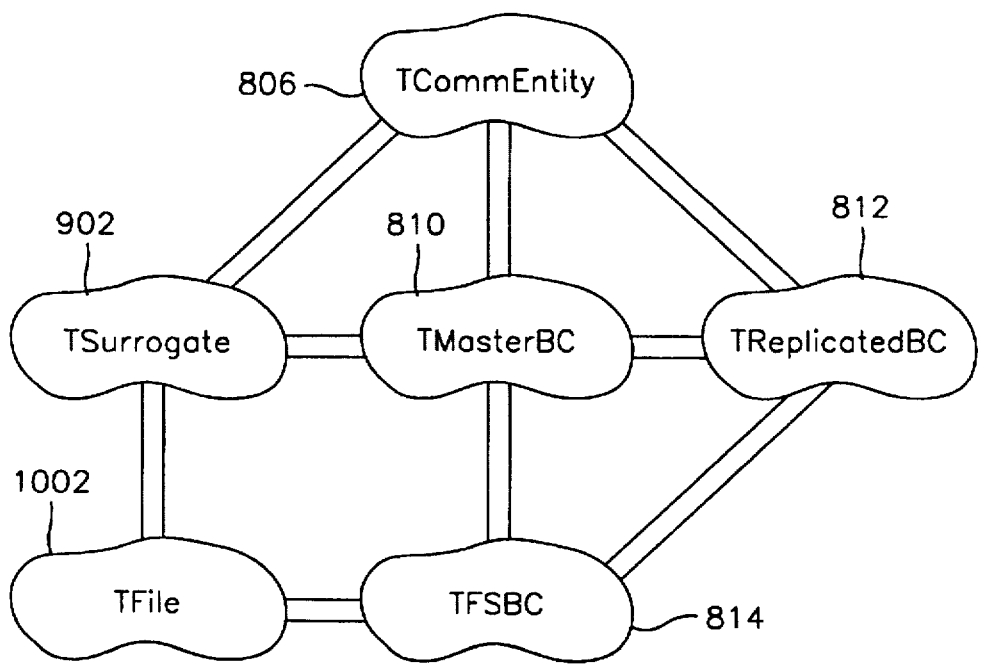
FIG. 10 illustartes the using relationships between the classes and subclasses of mixing properties in accordance with the present invention.

Referring to FIG. 10, the using relationships between the classes and subclasses of mixing properties 800 is illustrated. Communication information is initially stored within TFile 1002 which has a using relationship with TSurrogate 902 and TFSBC 814. TMasterBC 810 utilizes TSurrogate 902 to receive information stored within person objects which are connection related to TPerson 802. Since a business card is typically a subset of public information contained within a person object, changes within a person should be reflected the master business card. Hence, the using relationship between TMasterBC 810 and TSurrogate 902. TMasterBC 810 employs TCommEntity 806 for publication of its information within the network name space. Published information can then be copied from TMasterBC 810 or from TCommEntity 806 into TReplicatedBC 812. When either a master or copied business card reside on a disk, TFSBC 814 can also be employed within a using relationship.

Many attributes are stored within a business card. As such, a business card can be considered to have a number of different backing objects. Each backing object holds a definitive value for some attribute of the business card. In general, business cards are views of person objects. This relationship means that information stored within the person object is also contained in the business card. Accordingly, the person object is considered the definitive source. Other business cards are created solely from name service entities. In such instances, the name service object is deemed the backing object. Replicated business cards have master business cards as their primary backing object. The three aforementioned primary backing objects (person objects, master business card objects and name service entities), thus share a common interface for property support.

Figure 11:
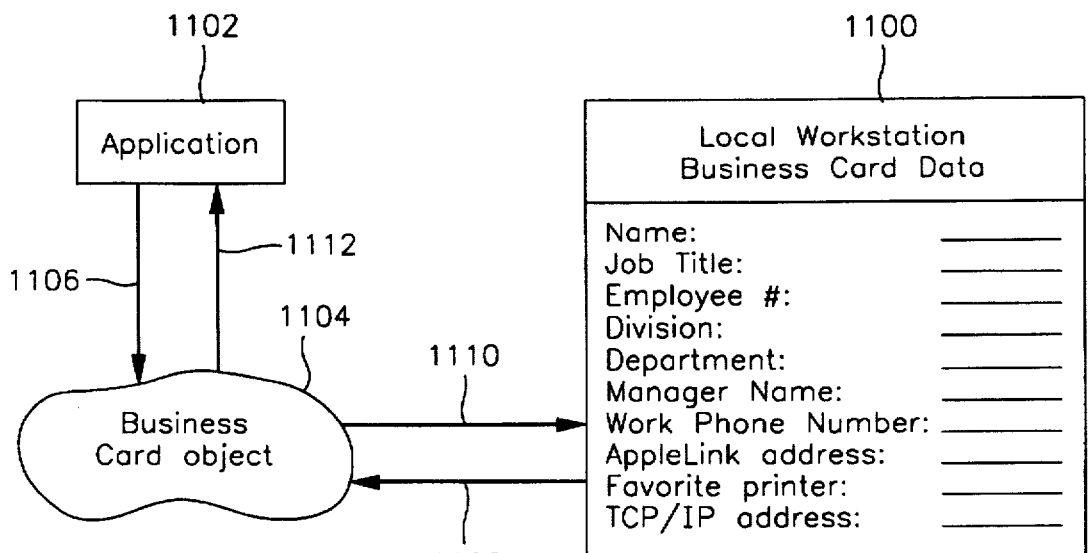
FIG. 11 illustrates the method of retrieving business card information when the information selected for retrieval exists upon the workstation where retrieval is sought in accordance with the present invention.

Referring to FIG. 11, the method of retrieving business card information when the information selected for retrieval exists upon the workstation where retrieval is sought. When an application seeks to retrieve a business card, as referred to with reference numeral 1102, corresponding business card object 1104 is initially solicited. In turn, business card object 1104 allocates data corresponding to the selected business card object within the local workstation 1100 as indicated by directional arrow 1108. Local workstation 1100 possesses all data contained with a given business card as illustrated within block 1112. The corresponding data is then retrieved from local workstation 1100 and transferred to business card object 1104. Thereafter, the corresponding data is further transferred to application 1102 which originally solicted such information.

Sufficient information is stored within name services to allow for browsing of business card objects and the making of network connections with the objects described by the business cards. Such design permits complete business cards to be instantiated from name service entities through the utilization of the publishing host. Also, partial business cards can be created from name service entities. Partial business cards can be employed in transactions without being fully instantiated. Only the necessary information will be obtained from the publishing host.

Figure 12:
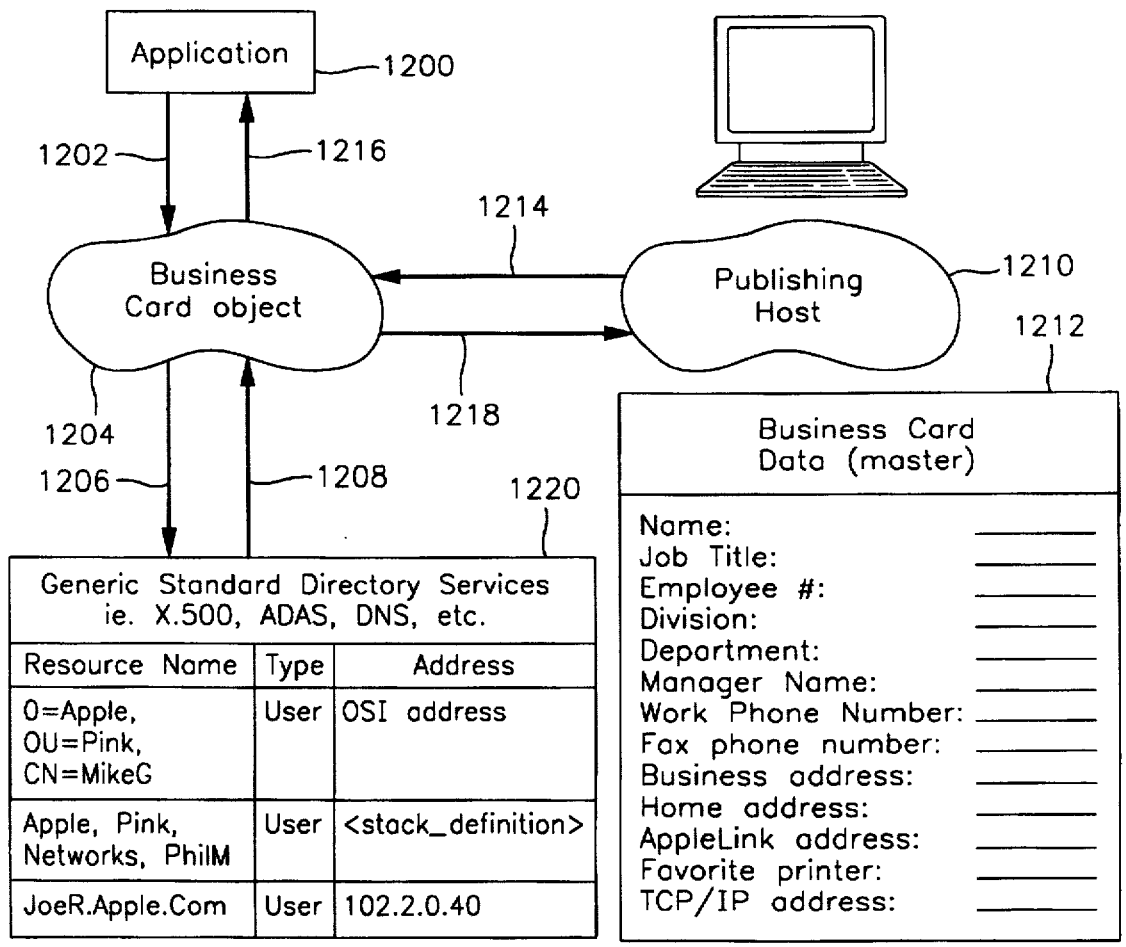
FIG. 12 illustrates the method of retrieving business card information when the information selected for retrieval does not exist upon the workstation where the retrieval is sought in accordance with the present invention.

Referring to FIG. 12, the method of retrieving business card information when the information selected for retrieval does not exist upon the workstation where the retrieval is sought. As indicated by directional arrow 1202, application 1200 initially selects business card object 1204. Business card object 1204 then allocates the address corresponding to business card object 1204 within the network name services data base 1220. Thereafter, the network name services data base 1220 transfers such allocated address back to business card object 1204. The allocation and transfer of a corresponding address are indicated by directional arrows 1206 and 1208, respectively. Business card object 1204 then allocates the data corresponding to the selected business card object within publishing host 1210. This is accomplished through the utilization of the retrieved address. Publishing host 1210 possesses all data relevant to a given business card object as illustrated within block 1212. The corresponding data is then transferred from publishing host 1210 to business card object 1204 and then further transferred to application 1200. Such transfers are indicated by directional arrows 1214 and 1216, respectively.

This design provides many advantages. First, simpler modification of business card information is permitted while browsing functionality is accomplished without excessive broadcast behavior. Second, access failures are avoided since the information is highly distributed. Thus, if the name service is inaccessible, business cards still contain adequate information for non-network connections. Third, by partitioning the information between the directories and publishing hosts, sufficient information for a default connection is created within the workstation of an individual. Hence, network updates are considerably decreased since the information necessary for a default connection is minimal and changes infrequently.

The aforementioned design calls for the publishing host of a master business card to provide information to holders of partial name service based replicas or local replicas. For instance, a particular user might observe a business card within a network name service browser and copy it within the desktop of the particular user. The name service network only holds partial information, however, and a full business card must be created to store on that users machine. A fully instantiated business card is created by contacting the publishing host and obtaining all other information. The publishing host has a business card service running which answers such queries. It is capable of both returning the entire set of attributes or individual attributes for a given business card which it possesses. Name service entities will sufficient information to contact the business card service for a user which can, in turn, provide the remaining information.

The present invention allows for complete functionality within different network environments. Although some incompatible workstations will not be able to take full advantage of business card functionality, such workstations can act as targets of operations from compatible workstations. That is, a user operating upon a first network can retain a business card, having information on mail addresses, for a user who operates upon a second network. Although the second network is incompatible with the first, the retained business card may be utilized within a mail application just as one would for a user of the second network.

User applications of business cards are made simplistic. Naive users can create, modify, update, delete, and copy business cards, as well as utilize business cards within a collaboration. Knowledge of the replicated nature of a business card is hidden from a naive user. Further, knowledge of the distributed nature of a business card is also hidden from a naive user.

Business cards maintain limited utility when under fault conditions such as when the name service(s) supporting business cards is unavailable. Even if the name service supporting business cards is unavailable, replicated business cards can be used as normal. Thus, the when a network is inaccessible business cards are still viewable for manual usage, and connection mechanisms other than through the network are still operable such as the telephone connections and facsimile services.

It is desirable for individuals to keep track of documents received from a certain person or for which a certain person is a contact. Users may also want to be able to stamp a document with a users business card or person icon.

Maintenance of Replicated Business Cards

A set of mechanisms are employed for maintaining replicated versions of business card objects. Such mechanisms complement each other so as to provide a comprehensive feature set. Each mechanism within the set is not deemed to be exclusive of another, although expediency of implementation might require only a partial subset. The set of mechanisms is as follows: (i) manual user initiated updating, (ii) fault-based synchronization; and, (iii) periodic background synchronization.

The first mechanism, manual user initiated updating, is utilized when a user has modified a business card and seeks to reset the values of certain attributes back to the original state. In such a instance, a set of attributes can be selected and thereafter synchronized with those of the master business card.

The second mechanism, fault-based synchronization, is utilized when an attempt is made to use a business card, that is determined to contain inaccurate information, for a connection. In such an instance, an attempt is undertaken to update the business card with the most recent information from the master publishing host. This allows the replications to be updated when needed and has the additional advantage of consuming network bandwidth for synchronization with respect to only those replications actually employed.

The third mechanism, periodic background synchronization, is a process which periodically synchronizes replicated business cards with their masters. This occurs infrequently and does not consume large amounts of system resources or network bandwidth. The model for how this takes place can be characterized as pull-model synchronization.

Pull-model synchronization denotes a process which withdraws data from a master host. A procedure of withdrawing information from the master host is preferable to other procedures for the following reasons. First, pull-based replication allows for flexibility in determining the degree of staleness acceptable for the data. Second, push-model replications are ill-suited for application within the present invention. Push-model replications propagate updated information by requiring either broadcasted updates, knowledge of a set of replica hosts, or random host contact with the update propagated by an epidemic algorithm. However, the methods of copying business cards prohibits any design which requires knowledge of the replicated hosts. Moreover, epidemic algorithms proffer a number of assumptions concerning the data which are not valid in the present invention.

The design of the present invention does not provide for simultaneous synchronization of all replicated business cards on a workstation. Rather, only one or a few of the local replicated business cards are simultaneously synchronized when the workstation where they reside is largely idle. Therefore, individual business cards are synchronized on the same order or less. When a workstation has more than one replicated business card with the same publishing host, all such replicated business cards are synchronized simultaneously. This allows the replicated business cards to share a common connection and therefore eliminate additional operations. Also, updates to master data are likely to be infrequent and thus the majority of effort is in determining what is up to date and what is not. In this case, the synchronization process consumes the most time in establishing connections, and thus pooling such queries together is deemed highly beneficial.

Although epidemic algorithms are not employed within a synchronization mechanism for business cards, some aspects of the algorithms can be used to optimize synchronization performance as well as minimize load. First, whenever a workstation contacts another workstation to perform periodic synchronization of a replicated business card, a list of replicated business cards possessed by a workstation and their respective versions are passed to the master publishing host.

If the master publishing host has replicas which are more recent than those within the workstation, those replicas will be updated with the information in the publishing host replicas. In addition, the publishing host could update its replicas with the more recent versions within a workstation. Hence, a general synchronization between the two workstations is undertaken which results in the upkeep of current information.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for displaying electronic business cards stored on a computer having a memory and a display, the apparatus comprising:

(a) an object-oriented operating system resident in the memory of the computer the object-oriented operating system including business card class information;

(b) means for instantiating a plurality of business card objects in the memory from business card class information in the object-oriented operating system, each of the business card objects referencing a particular set of data stored in the memory including graphic data for generating a corresponding business card image and user-defined formatting data for defining a business card image presentation format, wherein at least two of the plurality of business card objects have a different business card image presentation format;

(c) means for storing sets of linked information in the memory each of the sets of linked information associated with a particular one of the plurality of business card objects;

(d) means for retrieving one of the plurality of business card objects from the memory;

(e) means, responsive to a reference in the retrieved business card object, for displaying on the display, the graphic data representing the corresponding business card image wherein the displayed business card image has a business card image presentation format defined by the corresponding user-defined formatting data;

(f) means responsive to a selection command from a first user for selecting one of the sets of linked information by user operated control means displayed with the graphic data representing the business card image;

(g) means for retrieving the selected one of the sets of linked information; and (h) means, controlled by the user-defined formatting data in the business card object, for displaying the selected one of the sets of linked information in a format appropriate for the selected one of the sets of linked information.

2. The apparatus as recited in claim 1 further comprising:

means for duplicating the business card object including graphic data for generating a corresponding business card image; and means for displaying the graphic data of the duplicated business card object to a second user using the formatting data in the business card object and the one of the sets of linked information selected by the first user.

3. The apparatus as recited in claim 2 further comprising:

mixin class information stored in the memory, the mixin class information including attributes a first member function for retrieving data in a plurality of formats and a second member function for storing data in a plurality of formats; and means for including the mixin class information in class information used to instantiate at least one of:

a business card object;

a person object; and a network name service object.

4. The apparatus as recited in claim 3, wherein the sets of linked information include system preferences and configurations associated with the first user which are displayed as a plurality of separate windows with each of the plurality of windows having an edge adjacent another of the plurality of windows and each of the plurality of separate windows includes a tab graphic for presentation on the display and each of the plurality of the business card objects includes:

means for responding to a first user selection of one of the tab graphics by displaying address, title, and telephone number information associated with the first user; and means for responding to a first user selection of another of the tab graphics for displaying icons representative of residence information, mailing address information, telephone information, electronic mail address, printer information, and contact information for the first user.

5. The apparatus as recited in claim 4, wherein one of the tab graphics is an office tab graphic associated with a second user; and the apparatus further comprises: means, responsive to a first user selection of the office tab graphic, for initiating a telephone call to the second user.

6. The apparatus as recited within claim 4, wherein one of the tab graphics is an office tab graphic associated with a second user and the apparatus further comprises: means responsive to a first user selection of the office tab graphic for initiating an electronic mail communication to the second user.

7. The apparatus as recited in claim 4, wherein one of the tab graphics is an office tab graphic associated with a second user and the apparatus further comprises means responsive to a first user selection of the office tab graphic for initiating a facsimile transmission to the second user.

8. The apparatus as recited in claim 1, wherein the apparatus further comprises:

means for displaying the business card image on the display at a first location;

means for dragging the displayed business card image to a second location on the display; and means for dropping the displayed business card image at the second location on the display to invoke a predetermined action.

9. The apparatus as recited in claim 1, wherein the apparatus further comprises:

means for displaying the business card image on the display at a first location; and means for dragging the business card image to a second location on the display.

10. The apparatus of claim 1 further comprising:

means for creating a plurality of categories of information associated with a business card object;

means for organizing the sets of linked information into the categories of information: and means for displaying each of the categories of information as a separate window having a tab graphic.

11. A method for displaying electronic business cards stored on a computer having a memory having business card class information stored therein and a display, the method comprising the steps of:

(a) instantiating a plurality of business card objects in the memory from the business card class information, each of the business card objects referencing data stored in the memory including graphic data for generating a corresponding business card image and user-defined formatting data for defining a business card image presentation format;

(b) displaying a business card view of at least two of the plurality of business card objects each of the at least two business card views having a different business card image presentation format;

(c) storing in the memory sets of linked information associated with the business card object;

(d) retrieving one of the plurality of business card objects from the memory;

(e) displaying on the display the graphic data representing the corresponding business card image in response to a reference in the retrieved business card object, wherein the displayed business card image has a business card image presentation format defined by the corresponding user-defined formatting data;

(f) selecting one of the sets of linked information by user operated control means displayed with the graphic data representing the business card;

(g) retrieving the selected one of the sets of linked information; and (h) displaying the selected one of the sets of linked information in accordance with the user-defined formatting data appropriate for the selected one of the sets of linked information.

12. The method as recited in claim 11, including the steps of:

(i) replicating the business card object; and (j) displaying the replicated business card graphic data to a second user using the formatting data in the business card object and the one of the sets of linked information selected by the first user.

13. The method as recited in claim 12 including the step of:

(k) including system preferences and configurations associated with the first user in the sets of linked information.

14. The method as recited in claim 13, including the step of:

(l) displaying system preferences and configurations associated with the first user as a plurality of separate windows stacked one on top of another and attached to the business card.

15. The method as recited in claim 14 wherein each of the plurality of separate windows includes a tab graphic for presentation on the display and wherein the method further includes the step of:

(m) displaying address, title, and telephone number information associated with the first user in response to a selection of one of the tab graphics by the first user.

16. The method as recited in claim 14, wherein each of the plurality of separate windows includes a tab graphic for presentation on the display and wherein the method further includes the step of:

(m) displaying icons representative of residence information, mailing address information, telephone information, electronic mail address, printer information, and contact information for the first user in response to a selection of another of the tab graphics by the first user.

17. The method as recited in claim 14, wherein each of the plurality of separate windows includes a tab graphic for presentation on the display, but the tab graphics are not initially displayed on the display and wherein the method further includes the steps of:

(m) displaying a listing icon on the display;

(n) selecting the displayed listing icon; and (o) displaying the tab graphics on the display in response to the selection of the listing icon.

18. The method as recited in claim 14, wherein one of the tab graphics is an office tab graphic associated with a second user and wherein the method further includes the step of:

(m) initiating a telephone call to the second user in response to a first user selection of the office tab graphic.

19. The method as recited in claim 14, wherein one of the tab graphics is an office tab graphic associated with a second user and wherein the method further includes the step of:

(m) initiating an electronic mail connection to the second user in response to a first user selection of the office tab graphic.

20. The method as recited in claim 14, wherein one of the tab graphics is an office tab graphic associated with a second user and wherein the method further includes the step of:

(m) initiating a facsimile transmission to the second user in response to a first user selection of the office tab graphic.

21. The method of claim 11, including the steps of:

(i) displaying the business card image on the display at a first location;

(j) dragging the displayed business card image to a second location on the display; and (k) dropping the displayed business card image at the second location on the display to invoke a predetermined operation.

22. A system for displaying electronic business cards on a display, the system comprising:

(a) a storage device having a plurality of electronic business cards stored thereon, each of the electronic business cards having graphic data for display in a graphic region of the electronic business card and text data for display in a text region of the electronic business card;

(b) means for generating a business card image for each of the plurality of the electronic business cards;

(c) means for defining a business card image presentation format for each of the plurality of electronic business cards coupled to said means for generating a business card image, wherein at least two of the plurality of business cards have different business card image presentation formats such that the same graphic data and text data in each of the at least two of the plurality of business cards is displayed in a first presentation format for a first one of the at least two of the plurality of business cards and a second different presentation format for a second one of the at least two of the plurality of business cards;

(d) means for retrieving each of the plurality of electronic business cards from the memory; and (e) means for displaying, on the display, graphic data representing the corresponding business card image, wherein the displayed business card image has a business card image presentation format defined by the corresponding user-defined formatting data.

23. The apparatus of claim 22 further comprising:

(f) means responsive to a selection command from a first user for selecting predetermined portions of the text and graphic data in the storage device to be displayed on the display;

(g) means for retrieving the selected portions of the text and graphic data from the storage device; and (h) means, controlled by the user-defined formatting data in the business card object, for displaying the selected portions of the text and graphic data retrieved from the storage device.

24. A computer program product comprising:

a computer useable medium having computer readable program code means for generating a business image for each of a plurality of electronic business cards stored on a storage device, each of the electronic business cards having graphic data for display in a graphic region of the electronic business card and text data for display in a text region of the electronic business card;

a computer useable medium having computer readable program code means for defining a unique business card image presentation format for each of the plurality of electronic business cards;

computer readable program code means for retrieving each of the electronic business cards from the memory; and computer readable program code means for display on a display a business card image representing a corresponding electronic business card wherein the business image is displayed in the corresponding unique business card image format.

25. The computer program product of claim 24 further comprising:

computer readable program code means responsive to a selection command from a first user for selecting predetermined portions of the text and graphic data in the storage device to be displayed on the display;

computer readable program code means for retrieving a selected portions of the text and graphic data from the storage device; and computer readable program code means for displaying the selected portions of the text and graphic data retrieved from the storage device.

* * * * *